US006969752B1

(12) United States Patent
Deng et al.

(10) Patent No.: US 6,969,752 B1
(45) Date of Patent: Nov. 29, 2005

(54) WATER SOLUBLE/DISPERSIBLE AND EASY REMOVABLE CATIONIC ADHESIVES AND COATING FOR PAPER RECYCLING

(75) Inventors: Yulin Deng, Marietta, GA (US); Zegui Yan, Marietta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 09/621,695

(22) Filed: Jul. 21, 2000

(51) Int. Cl.[7] .............................................. G08F 18/00

(52) U.S. Cl. .................... 526/292.2; 525/421; 525/423

(58) Field of Search ...................... 6/292.2; 526/292.2; 525/421, 423

(56) References Cited

U.S. PATENT DOCUMENTS

| | | | | |
|---|---|---|---|---|
| 4,871,594 | A * | 10/1989 | Bister et al. | 427/430.1 |
| 5,262,238 | A * | 11/1993 | Trouve et al. | 162/135 |
| 5,518,585 | A * | 5/1996 | Huth et al. | 162/168.1 |
| 5,640,470 | A * | 6/1997 | Iyer et al. | 385/12 |
| 6,007,803 | A * | 12/1999 | Mandeville et al. | 424/78.1 |
| 6,048,437 | A | 4/2000 | Fukushima et al. | |
| 6,069,216 | A * | 5/2000 | Iwasaki et al. | 162/135 |
| 6,099,586 | A | 8/2000 | Collins et al. | |
| 6,281,172 | B1 * | 8/2001 | Warren et al. | 507/110 |
| 6,290,947 | B1 * | 9/2001 | Fitzpatrick et al. | 424/78.08 |
| 6,482,776 | B1 * | 11/2002 | Matz et al. | 507/120 |
| 2003/0118791 | A1 * | 6/2003 | Yoshimura et al. | 428/195 |

FOREIGN PATENT DOCUMENTS

| | | |
|---|---|---|
| DE | 41 14 134 A1 | 4/1991 |
| WO | WO 96/06157 | 2/1996 |

OTHER PUBLICATIONS

Effects of Polypyridines as Peroxide Activations in TCF Bleaching of Kraft Pulps, T. Jaschinski et al., 1998 International Pulp Bleaching Conference, Book 2, pp. 417-420.

Use of Zeolites in Hydrogen Peroxide Bleaching of Pulp, K. Dyhr et al., Nordic Pulp and Paper Research Journal, vol. 13, No. 4/1998, pp. 257-260.

Development of the $P_{Fe}$ Process: A New Catalysed Hydrogen Peroxide Bleaching Process, J. Hall et al., Appita '99 Annual General Conference 2, pp. 455-459.

Kinetic Study on Delignification of Kraft-AQ Pine Pulp with Hydrogen Peroxide Catalyzed by Mn(IV)-$Me_4$DTNE, Yu Chi et al., Holzforschung vol. 54 (2000), pp. 413-419.

Application of a Catalyst in Peroxide Bleaching of Eucalyptus Kraft Pulp, L. Kühne et al., Holzforschung vol. 54 (2000), pp. 407-412.

Delignification with Acidic Hydrogen Peroxide Activated by Molybdate, V. Kubelka et al., Journal of Pulp and Paper Science, vol. 18, No. 3, (May 1992), pp. 108-112.

Reinforcement of Oxygen-Based Bleaching Chemicals with Molybdates, R. Agnemo, 1997 ISWPC, pp. 1-3.

The Use of Activated Hydrogen Peroxide and Peroxyacids in ECF Bleaching, J. Barna et al., 30th Congresso Annual de Celulose E Papel DA ABTCP Realizado em, Sao Paulo, Brasil, de 3 a 7 de Novembro de 1997, pp. 161-176.

Improving Alkaline Peroxide Delignification Using a Vanadium Activator, M. Suchy et al., TAPPI 1998 Pulping Conference, pp. 1277-1290.

The Nitrillamine Reinforced Hydrogen Peroxide Bleaching of Kraft Pulps, Dr. W. Sturm et al., 1993 Non-chlorine Bleaching conference Hilton Head, pp. 1-20.

Enhanced Delignification and Bleaching Using TAED Activated Peroxide, N. Turner et al. TAPPI 1998 Pulping Conference, pp. 1269-1275.

The Use of Activated Peroxide in ECF and TCF Bleaching of Kraft Pulp, J. Jäkärä, pp. 1-38.

* cited by examiner

*Primary Examiner*—Bernard Lipman
(74) *Attorney, Agent, or Firm*—Troutman Sanders LLP; Ryan A. Schneider

(57) ABSTRACT

The present invention is an adhesive or coating composition that is dispersible or dissolvable in water, making it useful in as a coating or adhesive in paper intended for recycling. The composition of the present invention is cationically charged thereby binding with the fibers of the paper slurry and thus, resulting in reduced deposition of adhesives on equipment during the recycling process. The presence of the composition of the present invention results in stronger interfiber bonding in products produced from the recycled fibers.

16 Claims, 1 Drawing Sheet

WATER SOLUBLE/DISPERSIBLE AND EASY REMOVABLE CATIONIC ADHESIVES AND COATING FOR PAPER RECYCLING

GOVERNMENT INTEREST

This invention was made with Government support under contract No. DE-FC36-99GO10379, awarded by the Department of Energy. The Government has certain rights in this Invention.

BACKGROUND OF THE INVENTION

I. Field of the Invention

The present invention relates to the field of adhesive and coating compositions and, more particularly, to a cationically charged adhesive or coating comprising a polymer which is dispersible or dissolvable in water. Because cationically charged adhesives or coatings can absorb to paper fibers, there is no deposition or substantial accumulation of sticky materials during a paper recycling process. Thus, the adhesives and/or coatings according to the present invention may be repulped and recycled along with paper during a paper recycling process without the problems associated with prior adhesives.

II. Description of the Prior Art

Conventional adhesives and coatings have long been a problem for the paper recycling industry because they tend to agglomerate and form so-called "stickies" that deposit on felts, press rolls, and drying cylinders during the paper recycling process. The stickies cause the machinery to run less efficiently and break down more often. The presence of stickies in the recycling process also reduces the quality of the recycled paper by, inter alia, forming holes and/or cosmetic flaws, such as dirty points, in the paper.

Technologies currently being evaluated by adhesive manufacturers in an effort to improve the paper recycling process can be divided into two categories: i) recoverable adhesives and ii) water soluble/dispersible adhesives. Recoverable adhesives can further be divided into two types: i) adhesives that have a high glass transition temperature or melting temperature, i.e., hot-melt adhesives and highly cross-linked adhesives, such that they will not soften and breakdown under repulping conditions; and ii) adhesives that have a density significantly lower or higher than the density of water and of fibers.

Recoverable adhesives unfortunately have several drawbacks. First, the adhesives with a high glass transition temperature or high cross-link degree usually exhibit substantially no spreading on the substrate at room temperature and, therefore, cannot be used as pressure sensitive adhesives (PSA's). Second, adhesives having a density lower or higher than that of fiber cannot be easily separated from the pulp furnish because those adhesives usually form large particles with the fibers and fillers during paper recycling and papermaking. Because the majority of the particles in the pulp furnish are fibers and fillers rather than adhesive particles, the final density of the aggregated particles is close to that of the fibers and fillers. Thus, the particles are difficult to remove. Third, only a limited number of high and low-density polymers exhibit adhesion-on-contact.

Adhesives and coatings that are soluble or dispersible in water have the advantage that they do not form stickies during the paper recycling process. Conventional compositions for water soluble/dispersible PSA's and coatings are described in various patents. For example, U.S. Pat. No. 5,928,783 discloses a PSA containing an aqueous emulsion polymer made by reacting at least one ethylenically unsaturated monomer with about 0.1 to 5% by weight, based on the total weight of the monomer, of a water soluble or dispersible polymerizable surfactant having a terminal allyl amine moiety. The ethylenically unsaturated monomer is defined to exclude ionic monomers and is preferably an alkyl acrylate monomer. An ionic monomer may optionally be used in addition to the ethylenically unsaturated monomer in an amount of from about 0.01 to about 10% by weight, based on the amount of ethylenically unsaturated monomer. Preferred ionic monomers are acrylamido methyl propane, sulfonic acid, styrene sulfonate, sodium vinyl sulfonate, acrylic acid, methacrylic acid, and the $C_4$–$C_8$ alkyl half esters of maleic acid, maleic anhydride, fumaric acid, and itaconic acid.

U.S. Pat. No. 5,574,117 relates to an acrylic polymer suitable for use as a PSA. The acrylic polymer, which contains no surfactant, may be prepared by bulk polymerization of a monomer having an acrylic acid-based monomer, a sulfur compound, and a polymerization initiator. The acrylic acid-based monomer unit has a number-average molecular weight (Mn) in the range of 1,000 to 1,000,000, a glass transition temperature of −80° C. or higher and a molecular weight distribution (Mw/Mn) of 5 or less. A PSA containing the acrylic polymer has the advantage of having a high heat resistance.

U.S. Pat. No. 5,714,543 pertains to a polyurethane PSA containing water soluble polymer additives having enhanced water uptake. Appropriate water soluble polymer additives have a solubility parameter ranging from 8 to 14 in solvents that exhibit poor hydrogen bonding, e.g., hexane. The polymer additives do not contain moieties which will react with isocyanates.

U.S. Pat. No. 5,380,779 sets forth a PSA composition that is water-dispersible when exposed to acidic conditions. The PSA composition comprises a terpolymer of a hydrophobic monomeric acrylic or methacrylic ester of a non-tertiary alcohol (monomer A); a polar monomer co-polymerizable with monomer A and having carboxylic, sulfonic acid or hydroxyl functionality or combinations thereof (monomer B); and a water soluble or water dispersible macromolecular monomer of the formula X—Y—Z, where X is a co-polymerizable moiety containing a double bond, Y is a divalent linking group, and Z is a water dispersible polymeric moiety. The macromolecular monomer is co-polymerizable with monomer A and monomer B. The combined acid groups of monomer B are neutralized from 5 to 100% based on the total amount of acid groups. The PSA composition further comprises tackifiers and/or plasticizers at a level such that the ratio of terpolymer to additives ranges from 0.2:1 to 5:1.

U.S. Pat. No. 5,439,748 discloses a water soluble or dispersible PSA composition that exhibits water solubility or dispersibility even in an acidic aqueous solution. The PSA comprises a sulfonate-containing copolymer obtained from 20 to 99% by weight of an alkoxyethyl acrylate, 1 to 30% by weight of a styrene sulfonic acid salt, and up to 50% by weight of a monomer mixture of acrylic acid-caprolactone adducts.

U.S. Pat. No. 5,489,642 describes a PSA which exhibits good adhesive properties even in thin layers and ensures satisfactory repulpability even in hard waters. The contact adhesive comprises a graft polymer in which 3–20% by weight of vinyl compounds having sulphonic acid salt groups are grafted onto a copolymer of (meth)acrylates and (meth)acrylic acid. The adhesive also includes water soluble plasticizers to render it tacky.

U.S. Pat. No. 5,169,441 pertains to charge reversal of finely divided fillers and pigments, such as clay, titanium dioxide, calcium carbonate, silicas, and silicoaluminates and discloses a paper coating composition. The fillers and pigments are treated with water soluble cationic polyelectrolyte polymers composed of the reaction product of epichlorohydrin and compounds containing 50 to 80% of cyclic quaternary functional groups.

Although conventional water soluble or dispersible adhesives and coatings do not necessarily form stickies that could damage paper recycling and papermaking machinery, the accumulation of dissolved or dispersed compounds is still an unsolved problem of paper recycling. It is theorized that the presence of accumulated adhesives or coatings in the paper making white water will affect other processing polymers used in papermaking, such as retention aids, sizing agents and strength additives. Further, accumulated adhesives in the white water will precipitate, if present at a sufficiently high concentration. Thus, it is desirable to form a recyclable adhesive or coating that would not require removal by a screen from the water used for paper recycling. Absent this generally performed screening step, the paper recycling process would be more efficient. It would also be advantageous to develop an adhesive or coating that may be recycled along with paper without concerns that the quality of the recycled paper might suffer.

SUMMARY OF THE INVENTION

The present invention contemplates a recyclable adhesive or coating composed of a polymer which is soluble or dispersible in water. The polymer comprises a cationically charged monomer and a backbone co-polymerizable with the cationically charged monomer. An adhesive according to the present invention may be substantially tacky such that it serves as a pressure-sensitive adhesive, or alternatively, it may have a relatively high glass transition temperature or melting temperature such that it serves as a hot-melt adhesive. Whatever type of adhesive is formed, the adhesive exhibits good adhesion and cohesion properties when attached to a surface.

Formation of the adhesive or the paper coating involves combining the cationically charged monomer and the backbone at pre-selected concentrations such that the polymer formed has 5 to 40 mol % of cationic repeat units. The "charge density", which is also referred to as cationic repeat units or cationic content, is defined as the ratio of the number of cationic monomer repeat units relative to the number of backbone units. The resulting reaction mixture is then polymerized by any well-known polymerization technique, e.g., emulsion polymerization, micro emulsion polymerization, miniemulsion polymerization, solution polymerization, condensation polymerization, or precipitation polymerization.

The polymer formed preferably includes, but is not limited to, about 60 to 95 mole % of the backbone and about 5 to 40 mole % of a cationically charged monomer. The mole percent for the backbone and the cationically charged monomer may, however, be broader than these ranges. The preferred upper limit for the mole percent is selected to ensure that the cost of producing the adhesive is not excessively high and appropriate products can be produced above this range if the economies do not preclude it. The lower limit ensures a sufficient cationic content for the adhesive. This limit could be modified provided an undesirably low cationic content for the adhesive did not result. The cationically charged monomer is preferably an alkyl ammonium halide, such as diallyldimethylammonium chloride or {3-(methacryloylammino)propyl}trimethyl-ammonium chloride.

The polymer may be further modified by adding other components to the reaction mixture. For example, an internal cross-linker, such as ethylene glycol dimethylate, may be added to the reaction mixture in an amount of 0 to 2 mole % based on the polymer. Water soluble uncharged monomers or macromers also may be introduced into the reaction mixture to improve the solubility of the adhesive in water at less expense than would increasing the amount of cationically charged monomer added to the reaction mixture. Appropriate materials and amounts would be readily apparent to the skilled artisan. In addition to the polymer, the adhesive may also comprise plasticizers and tackifiers, such as polyethylene glycol or rosin, to increase the flexibility and the tackiness of the adhesive.

Recycling of paper products containing adhesives or coating first involves the repulping of the paper products by placing them in water to form a pulp slurry. The adhesive or coating dissolves or becomes dispersed in the water during the repulping process. Whether the adhesive or coating is water soluble or dispersible depends on the content of the monomers in the polymer. In contrast to water-soluble PSA's found in the prior art, the adhesives described herein are positively charged so that they will adsorb onto fibers, fines, and fillers when they are dissolved or dispersed in the pulp slurry. As a result, the cationic water-soluble adhesives can be easily removed with the fibers, fines, and fillers from a paper machine or recycling equipment. The adhesive or coating of the present invention therefore will not cause sticky problems during paper recycling.

A water soluble dispersible adhesive or coating improves the strength of the recycled paper product formed from the pulp slurry. In particular, molecules or micro particles of the adhesive or coating have a cationic content sufficient to cause them to be attracted to paper fibers and surfaces of fines when dispersed in water, rather than accumulating into agglomerates that hinder the bonding of paper fibers. These molecules or micro particles form bridges between the fibers, thereby strengthening the bonds between those fibers.

Further advantages of the invention will be set forth in part in the description which follows and in part will be apparent from the description or may be learned by practice of the invention. The advantages of the invention may be realized and attained by means of the instrumentalities and combinations particularly pointed out in the appended claims.

The accompanying drawings are included to provide a further understanding of the invention and are incorporated in and constitute a part of the specification. The drawings illustrate embodiments of the invention, and together with the description, serve to explain the principles of the invention.

DETAILED DESCRIPTION

Figure 1:
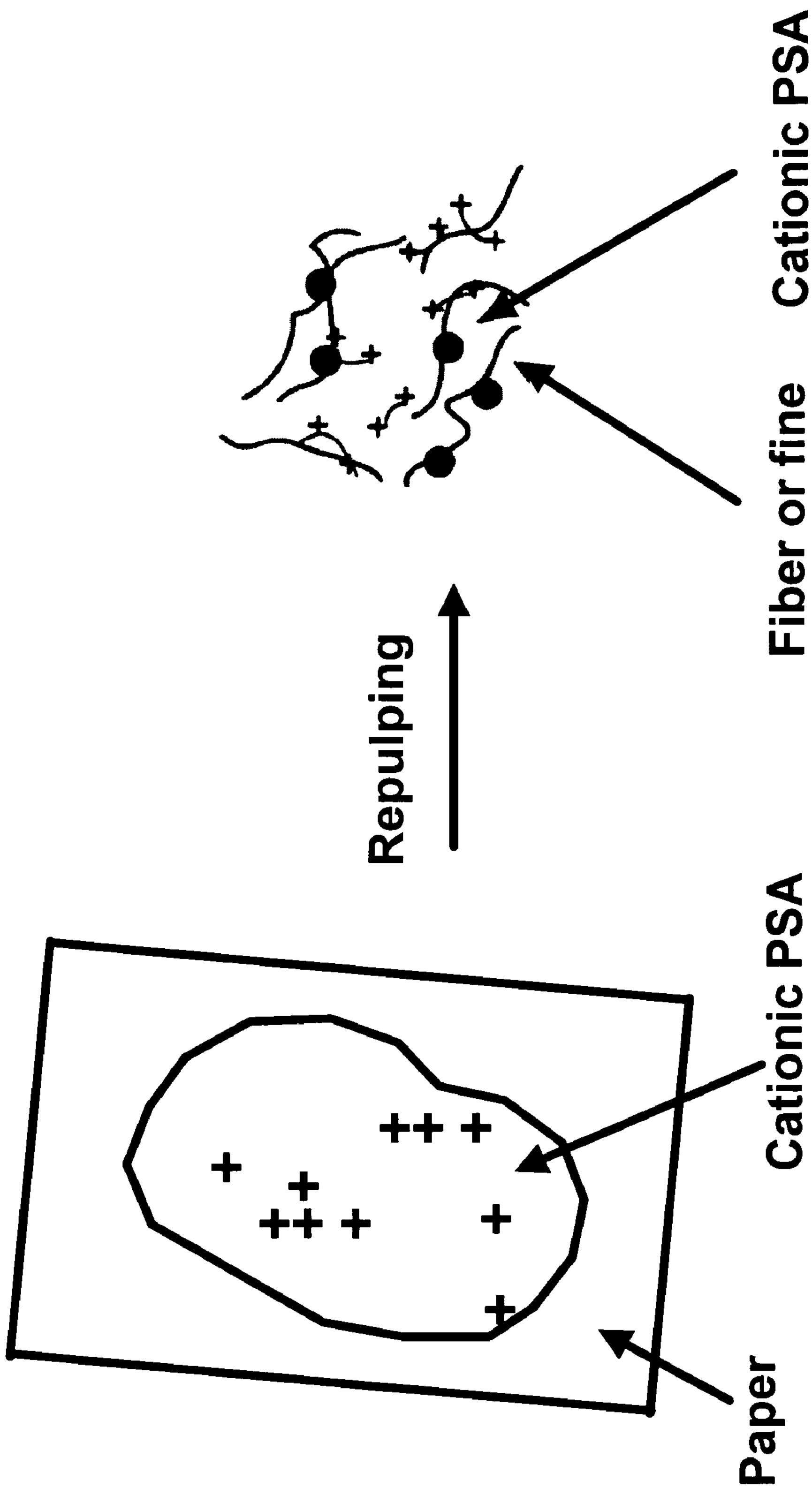
FIG. 1 illustrates a cationically charged PSA or coating according to an embodiment of the present invention, wherein the PSA or coating is attracted to fiber or fines when it is repulped along with the paper to which it is attached.

The invention relates to a recyclable/repulpable adhesive or coating composition composed of a cationically charged polymer which is soluble or dispersible in water. One unique feature of the adhesive is that its cationic content is sufficient to cause molecules or micro particle of the adhesive to absorb on fibers, fines and fillers. This improved adhesive or coating therefore overcomes the problems experienced by conventional paper recycling processes and improves the quality of recycled paper.

The cationically charged polymer contains one or more backbone compounds co-polymerized with one or more cationically charged monomers. The preferred content of the backbone in the polymer is about 60 to 95 mole %, most preferably 80–90 mole %. Nonlimiting examples of appropriate compounds to be used for the backbone are vinyl acetate, butadiene, styrene, acrylate containing 1 to 8 carbon atoms in the alkyl group, polyester, polyamide and combinations thereof. The acrylate is preferably selected from alkyl(meth)acrylates, such as n-butyl acrylate, 2-ethyl hexyl acrylate, and isooctyl acrylate. Of these compounds, n-butyl acrylate is the most preferred. As would be apparent to a person of ordinary skill in the art, some of the compounds listed above have properties that would make them more suitable for adhesives than for coatings and vice versa. Further, some of the compounds that are more suitable for adhesives than coatings may also be more suitable for PSA's than for hot-melt adhesives, and vice versa. Appropriate selection would be readily apparent to the skilled artisan.

The cationically charged monomer is present in the polymer in an amount of about 5 to 40 mole %, preferably 8 to 25 mole % and most preferably 10–20 mole %. Alkyl ammonium chlorides, such as {3-(methacryloylammino) propyl}trimethyl-ammonium chloride (MAPTAC), {2-(methacryloyloxy)ethyl}trimethyl-ammonium chloride (MAPTAC, diallyldimethyl-ammonium chloride (DADMAC), and vinyl-benzyl trimethyl-ammonium chloride (VBC), may serve as the cationically charged unit. The following reaction illustrates one example of the preparation of a cationically charged PSA:

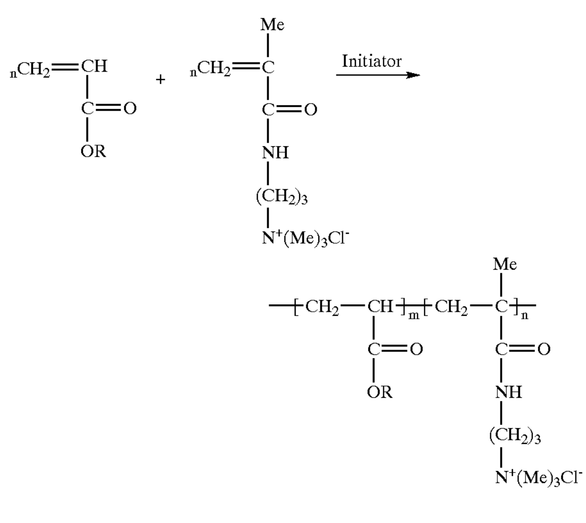

In addition, the polymer may contain from about 0 to 2 mole % of an internal cross-linker, such as ethylene glycol dimethylate (EGD,) diallyl maleate (DAM), diallyl phthalate (DAP), divinyl benzene (DVB), and poly(ethylene glycol)di(meth)-acrylate (PEGDMA). The internal cross-linker is preferably present in the amount of 0.1 to 1 mole % based on the polymer and most preferably 0.2 to 0.8 mole %. The polymer may also contain about 0 to 35 mole % of uncharged water soluble monomer or macromer. Examples of suitable uncharged monomers or macromers are dialkylaminoethyl methacrylate, hydroxy alkyl(meth)acrylate, hydroxy alkyl vinyl ether, poly(ethylene glycol)(meth)acrylate, polyethylene glycol, glycerol, diethylenetriamine, polyethyleneimine, and combinations of these compounds.

The adhesive may also include other components, such as tackifiers to increase its tackiness and plasticizers to increase its flexibility. A tackifier is required to form a PSA when the monomer backbone is made of a non-tacky material, e.g., styrene-butadiene copolymers. When present, the tackifier content of the adhesive preferably ranges from 0 to 20 weight % can be varied depending on what type of PSA is desired (such as high strength verses low strength PSA, high tacky PSA verses peelable PSA.). Appropriate modification of the tackifer content would be readily apparent to the skilled artisan. Examples of suitable tackifiers are rosin compounds and relatively low molecular weight poly(ethylene glycol) compounds. Other plasticizers and tackifiers that may be used with the invention would be apparent to a person of ordinary skill in the art.

According to a preferred embodiment, the recyclable composition is a pressure-sensitive adhesive that is substantially tacky and adheres to surfaces on-contact. Such an adhesive may be used to form tape, a self-adhesive stamp, the backside of a label, or a coating for paper that may be easily peeled from a surface. The properties of the PSA, e.g., its peel strength and sheer strength, may be altered to meet its purpose by varying the types and amounts of compounds used to form the PSA.

In an alternate embodiment, the adhesive is a hot-melt adhesive that is capable of bonding to a surface when heated to above its melting temperature. The cationic monomers and water-soluble non-ionic monomers as described above are introduced to the backbone of well-known hot-melt polymers, such as alkene-vinyl acetate copolymer, alkene-styrene copolymer, vinyl acetate copolymer, polyester, and polyamide, by means of free-radical polymerization, condensation polymerization, or direct modification of commercial hot-melt products. The modification steps would be readily understood by the person skilled in the art. In this manner a cationically charged hot-melt adhesive which is water soluble or dispersible is formed. Because the hot-melt adhesive is attracted to fibers, fillers, and fines during the paper recycling process, no stickies undesirably develop during this process.

Diethylenetriamine, polyethylene glycol, and polyethyleneimine, with a molecular weight preferably less than 3000, are uncharged monomers or macromers that may be incorporated into the polyester or polyamide prior to the reaction.

The adhesive or coating is prepared by polymerizing a reaction mixture containing the components, as described above, that are required to form the desired adhesive or coating composition. The concentrations of the cationically charged monomer and the backbone added to the reaction mixture are chosen based on the desired repulping cationic content of the coating or composition. The reaction mixture may be polymerized by heating it to a temperature sufficient to initiate polymerization of the mixture for the period of time required to complete the reaction in the presence or absence of an initiator. Appropriate initiators will be readily apparent to the skilled artisan. The polymerization temperature and heating time required depends on the particular compounds being reacted and the type of polymerization being performed and will be readily apparent to a person having ordinary skill in the art.

Solution polymerization is the preferred method of polymerization, but other well-known methods of polymerization, e.g., emulsion polymerization, non-solvent bulk polymerization, micro emulsion polymerization, miniemulsion polymerization, and precipitation polymerization may also be used. When emulsion polymerization or solution polymerization are used to prepare the adhesive or the paper coating, the solid content, i.e., copolymer content, of the product is about 30 to 65 weight %, preferably 40 to 60 weight % and most preferably 45 to 55 weight %.

As shown in FIG. 1, the adhesive or coating, e.g., PSA, of the present invention may be applied to a paper product to adhere the paper to another object, such as a label or tape. During recycling the adhesive or coating-containing paper products becomes dissolved or dispersed in the recycling water. Since the adhesives are positively charged to have 5 to 40 mol %, preferably 8 to 25 mol %, and most preferably 10 to 20 mol %, of cationic repeat units, they are attracted to the negatively charged fibers or fines in the pulp slurry. Not wishing to be bound by thereof, it is believed that the adhesive molecules form chemical bridges between the fibers or fines. In this manner, the adhesive acts as a strength adjusting agent for the paper that is eventually formed from such fibers or fines.

The repulping step may be followed by removing contaminants from the fibers using a combination of various process steps, such as screening and cleaning. See, e.g., U.S. Pat. Nos. 5,895,556, 5,904,808, and 6,001,218, which are fully incorporated by reference herein, for a detailed description of steps that may be employed in the recycling process of the present invention. Other recycling steps would be apparent to a person of ordinary skill in the art.

The invention is further discussed in conjunction with the following examples, which are merely illustrative of the present invention.

EXAMPLES

All of the following percentages are based by weight unless otherwise indicated.

Examples 1–2

Emulsion P lymerization

Selected examples of polymeric adhesives prepared by emulsion polymerization are listed in Table 1. The solid content of the mixture was kept at 50%. The following method was used to form Example 2 and is exemplary of the steps used to prepare the adhesive samples. The following materials were added to a 250 ml reactor equipped with a mechanical stirrer and a nitrogen inlet tube: 41 g of deionized water, 38.5 g of butyl acrylate (BA), 14.6 g of a 50% solution of MAPTAC, 2.3 g of polyoxyethylene(40)isooctylcycldohexy ether, and 1.4 g of cetylammonium bromide (CTAB). The mixture was flushed with nitrogen for half an hour and heated to 60° C. After the temperature reached steady state, 0.23 g of 2,2'-azobis(N,N'-di methylene-isobutyramidine)di hydrochloride, which is an initiator, in 2 mL of water was added to the reaction mixture, and the reaction was continued for four more hours.

TABLE 1

| Sample | Monomer Composition | Weight Ratio |
|---|---|---|
| Control 1 | BA | 100 |
| Example 1 | BA/MAPTAC | 91.7/8.3 |
| Example 2 | BA/MAPTAC | 83.9/16.1 |

Examples 3–6

Solution Polymerization

Table 2 lists selected samples of polymeric adhesives prepared by solution polymerization. The solid content of the mixture was kept at 40%. The following method was used to form Example 4 and is exemplary of the steps used to prepare the adhesive samples. The following materials were added to a 250 ml reactor equipped with a mechanical stirrer, a condenser and a nitrogen inlet: 92 g of ethanol, 25.6 g of butyl acrylate (BA) and 9.8 g of 50% MAPTAC. The mixture was flushed with nitrogen for half an hour and heated to 65° C. After the temperature reached steady state, 0.36 g of 2,2'-azobisisobutyronitrile (AIBN), which is an initiator, in 2 ml of acetone was added, and the reaction was continued for an additional four hours.

TABLE 2

| Sample | Monomer Composition | Weight ratio |
|---|---|---|
| Example 3 | BA/MAPTAC | 91.7/8.3 |
| Example 4 | BA/MAPTAC | 83.9/16.1 |
| Example 5 | BA/MAPTAC | 76.6/23.4 |
| Example 5a | BA/MAPTAC/EGD | 76.4/23.3/0.3 |
| Example 5b | BA/MAPTAC/EGD | 76.1/23.2/0.7 |
| Example 6 | BA/MAPTAC | 70/30 |

The adhesive properties and recycling capability of the adhesive samples were tested, and the results are listed below.

1) Adhesive Strength

The 180° peel strength of the samples was measured according to the Pressure Sensitive Tape Council standard method PSTC-1 (1994). The shear strength was measured according to the standard method PSTC-7 (1994).

TABLE 3

Adhesive Properties of Commercial Adhesive Products

| Sample | Shear (min.) | Peel (oz/in.) |
|---|---|---|
| 1[a] | 232 | 9.4 |
| 2[b] | >40 h | 18.0 |
| 3[c] | <0.1 | 0.28 |
| 4[d] | 219 | 33.2 |

[a]Polyacrylic based PSA from Company 1, Rohm and Haas Company.
[b]Polyacrylic based PSA from Company 2, BF Goodrich Specialty Chemicals.
[c]Peelable note is from Company 3, 3M Company.
[d]Non-peelable general portal label is from Company 4, Office Supply Manufacturer (unknown).

TABLE 4

Adhesive Properties of Samples from Emulsion Polymerization

| Sample | Shear (min.) | Peel (oz/in.) |
|---|---|---|
| Control 1 | 2.6 | 4.4 |
| Example 1 | 0.1 | 3.4 |
| Example 2 | 0.5 | 6.1 |

TABLE 5

Adhesive Properties of Samples from Solution Polymerization

| Sample | Shear (min.) | Peel (oz/in.) |
|---|---|---|
| Example 3 | 12 | 23.1 |
| Example 4 | 26 | 18.8 |
| Example 5 | 59 | 5.5 |
| Example 5a | 342 | 7.8 |
| Example 5b | >40 h | 3.6 |
| Example 6 | 166 | 2.5 |

2) Water Solubility

The solubility of the PSA's in water were measured according to the following procedure: 0.4 g of PSA was added to 100 mL of water that had a pH of 8.0, and the mixture was stirred at 50° C. for half an hour. The solubility was identified from the visual appearance of the solution. For the water dispersible sample (i.e., Example 4), the size of one of the dispersed particles was measure by a Malvern Zeta-sizer 3000 from Malvern Instruments.

TABLE 6

The solubility of the adhesives in $H_2O$ at 50° C.

| Sample | Solubility in $H_2O$ at 50° C. |
|---|---|
| Example 3 | no |
| Example 4 | dispersible (<1.5 um) |
| Example 5 | yes |
| Example 5b | yes |
| Example 6 | yes |

3) Repulping and Retention Capability

A PSA sample having a thickness of 2 mil (0.002 inch) was applied to a silicon release liner where it was dried at 90° C. for 3 minutes. The sample was then transferred to white office paper. The final PSA content was adjusted to 1% of the white paper. The paper was torn into small pieces and soaked in water with a 1% consistency for 16 hours. The mixture was heated to 50° C. and disintegrated for 20,000 revolutions in the standard disintegrator with the propeller operating at 3,000 rpm in the stock. A handsheet was made, and the sticky particles on the handsheet were identified by coloration.

The retention of the water soluble/dispersible PSA on the fiber was measured as follows. The pulp furnish was filtered through filter paper. The filtrate, i.e., white water, was collected, and the PSA content in the filtrate was analyzed by colloidal titration or UV-VIS spectroscopy analysis. Table 7 provides the absorption ratio of different values of PSA content for Example 5.

TABLE 7

Retention capability of Example 5 on the wood fiber of office copy paper

| | | | | | | | |
|---|---|---|---|---|---|---|---|
| Content (% fiber) | 0.5 | 1 | 2 | 3 | 4 | 5 | 8 |
| Adsorption ratio (%) | 97.4 | 91.0 | 92.4 | 94.7 | 91.2 | 85.0 | 80.0 |

Example 7

Pressure-Sensitive Adhesive Accumulation

The accumulation of a PSA in a closed water system during paper recycling was studied as follows. A pulp stock of 4% consistency of recycled paper with 1% PSA based on the recycled paper was made according to the above procedure. After standing for one hour, the stock was filtered through a 200 mesh screen and 50 ml of the filtrate was collected. The rest of the filtrate was used for the next repulping step. The repulping step was repeated 8 times, and about 20% fresh water was initially added each time to compensate for the water loss in the previous step. Water from another pulping process that contained no PSA was collected as a reference. The PSA content in the filtrate collected after each repulsing step was measured according to the above procedure. After 8 cycles, the PSA content in the water reached 0.052 g/L with a total adhesive content greater than 0.4 g/L in the pulp. Based on this information, only about 13% of the original adhesive accumulated in the process water after 8 cycles. Normally the PSA content in the recycled fiber is about 0.25% of the fiber.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A recyclable adhesive or adhesive coating that is substantially tacky and forms a pressure-sensitive adhesive which is capable of bonding to a surface upon contact wherein the recyclable adhesive or adhesive coating comprises a polymer which is soluble or dispersible in water and is attracted to fibers during paper recycling wherein the polymer comprises a) at least 5 to 40 mol % of cationic repeat units;

b) a cationic monomer compound wherein the cationic monomer compound is 3-methacrylamidopropyltrimethylammonium chloride; and, c) a second monomer compound copolymerizable with the cationic monomer compound wherein the second monomer compound is n-butyl acrylate.

2. The recyclable adhesive or adhesive coating of claim 1, wherein the backbone compound is present in the amount of 60 to 95 mole % based on the polymer.

3. The recyclable adhesive or adhesive coating of claim 1, wherein the backbone compound is present in the amount of 80 to 90 mole % based on the polymer.

4. The recyclable adhesive or adhesive coating of claim 1, wherein the cationically charged monomer is present in the amount of 5 to 40 mole % based on the polymer.

5. The recyclable adhesive or adhesive coating of claim 1, wherein the cationically charged monomer is present in the amount of 8 to 25 mole % based on the polymer.

6. The recyclable adhesive or adhesive coating of claim 1, wherein the polymer further comprises an internal cross-linker present in the amount of up to 2 mole %, based on the polymer.

7. The recyclable adhesive or adhesive coating of claim 6, wherein the polymer further comprises an internal cross-linker present in the amount of 0.1 to 1 mole %, based on the polymer.

8. The recyclable adhesive or adhesive coating of claim 6, wherein the internal cross-linker is chosen from at least one of ethylene glycol dimethylate, diallyl maleate, diallyl phthalate, divinyl benzene, and poly(ethylene glycol)di (meth)acrylate.

9. The recyclable adhesive or adhesive coating of claim 1, wherein the polymer further comprises up to 35 mole % based on the polymer of an uncharged water soluble monomer or macromer.

10. The recyclable adhesive or adhesive coating of claim 9, wherein the uncharged water soluble monomer or macromer is chosen from at least one of dialkylaminoethyl methacrylate, hydroxy alkyl(meth)acrylate, hydroxy alkyl vinyl ether, poly(ethylene glycol)(meth)acrylate, poly(ethylene glycol), glycerol, diethylenetriamine, polyethyleneimine, and combinations of these compounds.

11. The recyclable adhesive or adhesive coating of claim 1, wherein the adhesive further comprises a plasticizer to increase the flexibility of the adhesive.

12. The recyclable adhesive or adhesive coating of claim 1, wherein the adhesive further comprises a tackifier to render the adhesive tacky.

13. The recyclable adhesive or adhesive coating of claim 1, wherein the adhesive or adhesive coating forms a tape.

14. The recyclable adhesive or adhesive coating of claim 1, wherein the adhesive or adhesive coating forms a label.

15. The recyclable adhesive or adhesive coating of claim 1, wherein the adhesive or adhesive coating forms a paper coating.

16. The recyclable adhesive or adhesive coating of claim 1, wherein the adhesive or adhesive coating forms a self-adhesive stamp.

* * * * *